United States Patent
Aruga et al.

(10) Patent No.: US 8,703,858 B2
(45) Date of Patent: Apr. 22, 2014

(54) FLUORORESIN FILM FOR AGRICULTURAL USE

(75) Inventors: Hiroshi Aruga, Tokyo (JP); Yasuko Shimoi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 668 days.

(21) Appl. No.: 12/985,795

(22) Filed: Jan. 6, 2011

(65) Prior Publication Data

US 2011/0105662 A1  May 5, 2011

Related U.S. Application Data

(63) Continuation of application No. PCT/JP2009/062623, filed on Jul. 10, 2009.

(30) Foreign Application Priority Data

Jul. 11, 2008 (JP) .................................. 2008-181387

(51) Int. Cl.
*H01B 3/04* (2006.01)
*C08K 5/24* (2006.01)

(52) U.S. Cl.
USPC .......................................... 524/449; 524/262

(58) Field of Classification Search
USPC ....................................................... 524/449
See application file for complete search history.

(56) References Cited

U.S. PATENT DOCUMENTS

2008/0081182 A1  4/2008  Nam et al.
2009/0297751 A1  12/2009  Nam et al.

FOREIGN PATENT DOCUMENTS

| JP | 6-133855 | 5/1994 | |
|---|---|---|---|
| JP | 07-53780 | 2/1995 | |
| JP | 7-299884 | 11/1995 | |
| JP | 10-292056 | 11/1998 | |
| JP | 10-298308 A | 11/1998 | |
| JP | 10298308 A | * 11/1998 | ................. C08J 5/18 |
| JP | 2006-248043 | 9/2006 | |
| JP | 2007-111002 | 5/2007 | |

OTHER PUBLICATIONS

Translation of JP 10-298308, Nov. 1998.*
International Search Report issued Oct. 20, 2009 in PCT/JP09/062623 filed Jul. 10, 2009.
Extended European Search Report issued Aug. 8, 2012 in Patent Application No. 09794529.9.
U.S. Appl. No. 13/090,423, filed Apr. 20, 2011, Shimoi, et al.

\* cited by examiner

*Primary Examiner* — Hui Chin
(74) *Attorney, Agent, or Firm* — Oblon, Spivak, McClelland, Maier & Neustadt, L.L.P.

(57) ABSTRACT

The present invention provides an agricultural fluororesin film having good optical transparency and good durability to repeated contact with other members and to repeated bending. The present invention relates to an agricultural fluororesin film, in which synthetic mica particles having an average particle size of 3 μm to 15 μm are dispersed in a film containing a fluororesin, in which the content of the synthetic mica particles is from 0.5 to 5 parts by mass based on 100 parts by mass of the fluororesin.

10 Claims, 1 Drawing Sheet

ABSTRACT# FLUORORESIN FILM FOR AGRICULTURAL USE

TECHNICAL FIELD

The present invention relates to an agricultural fluororesin film.

BACKGROUND ART

There are various kinds of resin films as covering materials for agricultural houses and the like. Above all, films of fluororesins represented by ETFE (ethylene-tetrafluoroethylene copolymer) have been noted as materials good in transparency and excellent in weather resistance even to outdoor exposure over a period of 10 years or more.

Of films for agricultural use, for example, one used in a configuration of being fixed by aluminum holding members at intervals of 50 cm to 200 cm does not flutter in the wind or the like, so that the life of the film is evaluated from weather resistance to light or rain.

On the other hand, according to a configuration of usage, durability to friction or bending is required in some cases. For example, when the film is used in a configuration of being fixed at four sides of its periphery and being fixed by fixing bands commonly called mica wires between arch-shaped pipes, in a semi-cylindrical house or the like; or when the film is used as a lower layer film of a two-layer air house which has recently been noted as an energy-saving house, friction or pounding occurs at contact portions of the film with metal frames when the film flutters in the wind. The film is therefore liable to be broken by the repetition thereof. The pounding to the metal indicates a phenomenon that the film comes into contact with metal pipes and the like blown by wind without interruption, in the case where peripheral edges of the film are not fixed or the like.

When breakage thus occurs, good weather resistance which is a characteristic of the fluororesin film is not sufficiently utilized. Even when the film itself is not deteriorated, repairing or re-covering thereof becomes necessary to cause a problem of increased labor and cost.

Further, when the fluororesin film is subjected to outdoor exposure over a long period of 10 years or more, crystallization gradually proceeds to deteriorate repeated-bending characteristics. For example, when the film is used in a mode of a so-called "roll-up use" which is configured so that roll-up/roll-down are possible in order to ventilate the inside of a house, breaks (cracks) due to friction and repeated bending are liable to occur. Accordingly, a film which can withstand this use has been desired.

Although patent literature 1 relates to a fluorine-based resin used for resin coating and the like, not for an agricultural film, it is described therein that an inorganic filler or a pigment is incorporated in order to improve wear resistance and hue, and that the filler or the pigment is treated with a silane coupling agent, thereby improving dispersibility in the fluorine-based resin. Mica is described in the examples of the inorganic fillers and the pigments.

Patent literature 2 relates to an agricultural film formed of a material which is not a fluororesin, and there is described the agricultural film comprising a laminate comprising: a layer composed mainly of a low-density polyethylene resin; and two layers composed mainly of an ethylene-vinyl acetate copolymer and different from each other in vinyl acetate content, wherein mica is allowed to be contained in at least one layer thereof, thereby increasing both scattered-light transmittance and total-light transmittance. It is described that the mica is not particularly limited in its kind and may be natural mica or synthetic mica, and that mica generally used is employed.

In patent literature 3, there is described a method of dispersing composite particles into a resin, in which the composite particles has a constitution of amorphous silica-cerium oxide-base pigment from the outermost layer side, in order to improve light diffusibility and UV protection properties of the fluororesin film. Silica, talc and mica are exemplified as the base pigments. The composite particles used herein have an average particle size of 1 to 3 µm.

Citation List

Patent Literature

Patent Literature 1 JP-A-7-53780
Patent Literature 2 JP-A-2006-248043
Patent Literature 3 JP-A-10-292056

SUMMARY OF INVENTION

Technical Problem

The agricultural fluororesin film is required special characteristics of being difficult to break even by repeated contact due to friction, pounding or the like and repeated bending as described above in addition to good optical transparency.

However, such a special problem of the agricultural fluororesin film has not been very recognized so far, and no solution thereto has been proposed.

The invention has been made in view of the above-mentioned circumstances, and an object of the invention is to provide an agricultural fluororesin film having good optical transparency and good durability to repeated contact with other members and to repeated bending.

Solution to Problem

In order to solve the above-mentioned problem, the present invention provides an agricultural fluororesin film comprising: fluororesin; and synthetic mica particles having an average particle size of from 3 µm to 15 µm and dispersed in the fluororesin, wherein the content of the above-mentioned synthetic mica particles is from 0.5 to 5 parts by mass based on 100 parts by mass of the fluororesin.

In the agricultural fluororesin film of the present invention, it is preferred that a treating agent selected from the group consisting of an alkyl group-containing silane coupling agent and a silicone compound is present on surfaces of the above-mentioned synthetic mica particles.

In the agricultural fluororesin film of the present invention, it is preferred that the above-mentioned treating agent is nonreactive silicone oil, and that the content of the nonreactive silicone oil in the film containing the above-mentioned fluororesin is from 0.02 to 0.3 parts by mass based on 100 parts by mass of the above-mentioned fluororesin.

In the agricultural fluororesin film of the present invention, it is preferred that the film has an initial tensile breaking strength of 50 MPa or more and a retention of a tensile breaking strength after 2,000-time sliding test of 80% or more.

In the agricultural fluororesin film of the present invention, the above-mentioned synthetic mica particles preferably have an average particle size of from 3 µm to 10 µm.

In the agricultural fluororesin film of the present invention, it is preferred that the above-mentioned synthetic mica particles have an average particle size of from 3 µm to less than 6 µm, and the content thereof is from 3 to 5 parts by mass based on 100 parts by mass of the above-mentioned fluororesin.

In the agricultural fluororesin film of the present invention, it is preferred that the above-mentioned synthetic mica particles have an average particle size of from 6 µm to less than 10 µm, and the content thereof is from 0.5 to 5 parts by mass based on 100 parts by mass of the above-mentioned fluororesin.

In the agricultural fluororesin film of the present invention, the film preferably has a visible light transmittance of 90% or more.

In the agricultural fluororesin film of the present invention, the above-mentioned retention is preferably 85% or more.

In the agricultural fluororesin film of the present invention, the above-mentioned synthetic mica is preferably potassium tetrasilicon mica or fluorphlogopite.

In the agricultural fluororesin film of the present invention, the film preferably has a haze of from 20% to 85%.

Advantageous Effects of Invention

According to the present invention, there is obtained the agricultural fluororesin film having good optical transparency and good durability to repeated contact with other members and repeated bending.

DESCRIPTION OF EMBODIMENTS

<Fluororesin>

Figure 1:
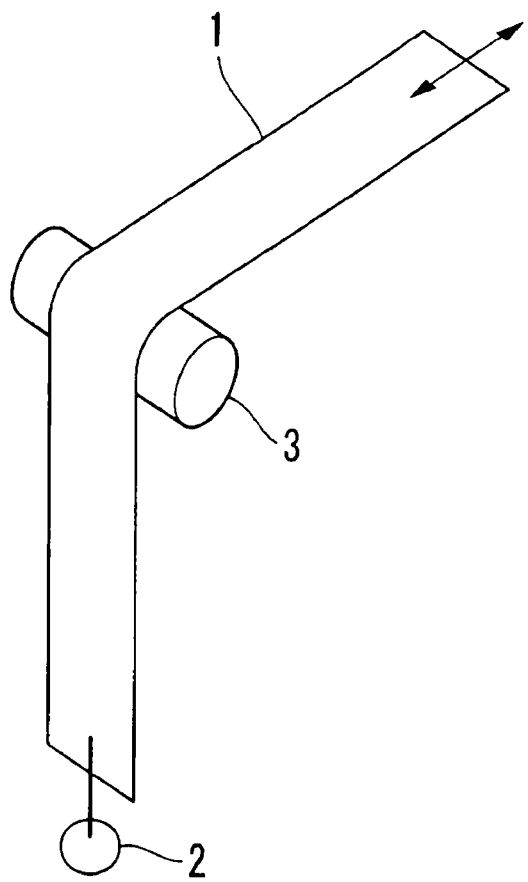
FIG. 1 is a schematic constitutional view for illustrating a sliding test method.

The fluororesins include polyvinylidene fluoride, polytetrafluoroethylene, polychlorotrifluoroethylene, polyhexafluoropropylene, polyvinyl fluoride, a vinylidene fluoride-tetrafluoroethylene-hexafluoropropylene copolymer, a vinylidene fluoride-hexafluoropropylene copolymer, an ethylene-tetrafluoroethylene copolymer, a tetrafluoroethylene-hexafluoropropylene copolymer, a perfluoro(alkyl vinyl ether)-tetrafluoroethylene copolymer and the like.

In particular, preferred are an ethylene-tetrafluoroethylene copolymer, a tetrafluoroethylene-hexafluoropropylene copolymer and a perfluoro(alkyl vinyl ether)-tetrafluoroethylene copolymer. Above all, an ethylene-tetrafluoroethylene copolymer (hereinafter referred to as ETFE) is more preferably used.

Although the number average molecular weight of the fluororesin is not particularly limited, it is preferably from 10,000 to 1,000,000 and more preferably from 100,000 to 700,000.

<Synthetic Mica Particles>

The synthetic mica particles used in the present invention are particles comprising synthetic mica. The synthetic mica means two kinds: one is potassium tetrasilicon mica represented by $KMg_{2.5}Si_4O_{10}F_2$, which is synthesized by solid reaction of talc represented by $Mg_3Si_4O_{10}(OH)_2$ and potassium silicofluoride represented by $K_2SiF_6$; and the other is fluorphlogopite represented by $KMg_3AlSi_3O_{10}F_2$. Both may be used either alone or in combination.

For example, JP-B-6-27002 discloses a method for producing synthetic mica by heating a mixture of a powder of conventional natural talc and an alkali silicofluoride powder. The above-mentioned $KMg_{2.5}Si_4O_{10}F_2$ and $KMg_3AlSi_3O_{10}F_2$ are non-swelling mica, and have a structure in which hydroxyl groups are all substituted with F. The specific surface area thereof is small and is from 1 to 5 $m^2/g$.

As the synthetic mica particles, there can be appropriately used a commercially available product. Specific examples of the products include MK Series (trade name) manufactured by CO-OP Chemical Co., Ltd., PDM Series (trade name) manufactured by Topy Industries, Ltd. and the like.

The average particle size of the synthetic mica particles used in the invention is from 3 to 15 µm, and more preferably from 3 to 10 µm. When the average particle size is less than 3 µm, the specific surface area increases. Accordingly, dispersion thereof in the fluororesin becomes difficult, and moreover, sufficient wear resistance is not obtained. When the average particle size exceeds 15 µm, the synthetic mica particles are liable to be exposed on a surface of the fluororesin film. Accordingly, good staining resistance which is a characteristic of the fluororesin film itself is impaired in some cases.

The content of the synthetic mica particles is from 0.5 to 5 parts by mass based on 100 parts by mass of the fluororesin. The more preferred content varies depending on the particle size of the synthetic mica particles. It is from 3 to 5 parts by mass in the case where the average particle size is from 3 µm to less than 6 µm, it is from 0.5 to 5 parts by mass in the case where the average particle size is from 6 µm to less than 10 µm, and it is from 2 to 4 parts by mass in the case where the average particle size is from 10 to 15 µm.

[Method for Measuring Average Particle Size]

The average particle size in this specification is a value obtained by the following measuring method. That is to say, the particle size distribution is measured by a laser diffraction scattering method, and a cumulative curve is determined, taking the whole volume of a mass of the particles as 100%. The particle size at a point where the cumulative volume becomes 50% on the cumulative curve, that is to say, the 50% size (cumulative median size) is taken as the value of the average particle size. As a measuring instrument, there can be used, for example, a micro-track particle size distribution measuring device (manufactured by Nikkiso Co., Ltd., product name: HRA X-100).

<Treating Agent>

A treating agent having a function of hydrophobizing surfaces of the synthetic mica particles is preferably allowed to be contained in the fluororesin film together with the synthetic mica particles. As such a treating agent, an alkyl group-containing silane coupling agent (S1) or a silicone compound (S2) is preferred.

It is not difficult to disperse the synthetic mica particles having an average particle size of 3 µm or more in the fluororesin. However, dispersibility of the synthetic mica particles is improved and coloring of the resin inhibited in a compounding process with the fluororesin or a film forming process, by allowing the above-mentioned treating agent to exist on the surfaces of the synthetic mica particles.

The use of the silane coupling agent (S1) can well improve dispersibility of the synthetic mica particles in the resin. However, when the silane coupling agent (S1) is allowed to be contained, hardening of the fluororesin film in outdoor exposure over a long period of time tends to proceed compared to the case where it is not contained.

Specific examples of the silane coupling agents (S1) include trialkoxysilanes such as isobutyltrimethoxysilane, hexyltrimethoxysilane and (3,3,3-trifluoropropyl)tri-methoxysilane; silazanes such as hexamethyldisilazane; chlorosilanes such as dimethyldichlorosilane; and the like. Of these, isobutyltrimethoxysilane is more preferred.

As a treating method in the case of using the silane coupling agent (S1), there can be used, for example, a method of mixing a given amount of the silane coupling agent (S1) and the synthetic mica particles in a solvent such as isopropyl alcohol (IPA) and evaporating the solvent at from 70° C. to 170° C. (a wet treating method). According to this method, there are formed particles in which the surfaces of the synthetic mica particles are covered with the silane coupling agent. Between the surfaces of the synthetic mica particles and the silane coupling agent, chemical bonding is generated.

An excessive amount of the silane coupling agent (S1) used causes the unreacted silane coupling agent to be firmly fixed to a screw or a cylinder when the synthetic mica particles and the silane coupling agent are kneaded with the fluororesin, resulting in a loss of adhesion before long to take a form of a large black mass in the kneaded resin. Accordingly, holes generate at the time of forming the film in some cases. On the other hand, in the case where the amount is too small, the mica particles are aggregated with one another when the synthetic mica particles and the silane coupling agent are kneaded with the fluororesin, resulting in that the film appearance is largely impaired, such as formation of white spots on the film. It is therefore preferred that the silane coupling agent is added in an amount of about from 0.3 to 10 parts by mass, more preferably in an amount of from 1 to 5 parts by mass, based on 100 parts by mass of the mica, to conduct surface treatment.

The use of the silicone compound (S2) can well improve dispersibility of the synthetic mica particles in the resin, and hardening of the fluororesin film is difficult to occur even by outdoor exposure over a long period of time to be liable to maintain flexibility. Although the reason for this is not clear, it is assumed that the silicone compound has an effect of inhibiting crystallization of the fluororesin.

Accordingly, the silicone compound (S2) is better than the silane coupling agent (S1).

The silicone compound (S2) means an organopolysiloxane having an organic group. Examples of the organic group include alkyl group, alkenyl group, aryl group, fluoroalkyl group and the like. In the present invention, it is preferably an alkyl group having 4 or less carbon atoms or a phenyl group. As the silicone compound (S2) used in the present invention, what generally called silicone oil can be preferably used.

The silicone oil is preferably nonreactive silicone oil which causes no chemical bonding with the synthetic mica particles and is only present on the surfaces of the synthetic mica particles. Specific examples of the nonreactive silicone oils include straight silicone oils such as dimethyl silicone oil and phenyl methyl silicone oil, alkyl-modified silicone oils, alkylaralkyl-modified silicone oils, fluorinated alkyl-modified silicone oils and the like. Of these, dimethyl silicone oil is preferred in terms of cost, and phenyl methyl silicone oil is preferred from the aspect of heat resistance.

The molecular weight of the silicone oil is preferably about 20,000 or less. When the molecular weight exceeds 20,000, the effect of improving dispersibility of the synthetic mica particles in the fluororesin is not sufficiently obtained. Although the lower limit value is not particularly limited, the molecular weight of the silicone oil is generally about 5,000 or more.

As the silicone compound (S2), there can be used a commercially available product. For example, dimethyl silicone oil includes SH200 (product name) manufactured by Dow Corning Toray Co., Ltd., KF96 (product name) manufactured by Shin-Etsu Chemical Co., Ltd., TSF451 (product name) manufactured by Toshiba Silicone Co., Ltd., and the like having various molecular weights (viscosity). Further, phenyl methyl silicone oil includes SH510 (product name), SH550 (product name), SH710 (product name) manufactured by Dow Corning Toray Co., Ltd. and the like.

As a treating method in the case of using the silicone compound (S2), there can be used, for example, a method of spraying the silicone oil to the synthetic mica particles in a mist state and drying to about 70° C. (a dry treating method). According to this method, there are formed particles in which the surfaces of the synthetic mica particles are covered with the silicone oil. In the case of the nonreactive silicone oil, between the surfaces of the synthetic mica particles and the silicone oil, no chemical bonding is generated, and a state where the silicone oil is present on the surfaces of the particles is obtained.

Alternatively, there can be used a method of concurrently adding the synthetic mica particles and the silicone compound (S2) to the fluororesin, followed by kneading, and then, forming the film. The silicone compound (S2) is liable to be present in the interface between the fluororesin and the synthetic mica particles, so that the synthetic mica particles come into a state where the surfaces thereof are covered with the silicone compound (S2) during kneading.

Alternatively, the same method as the above-mentioned wet treating method can also be used. In terms of simplicity of procedure, preferred is the method of adding the synthetic mica particles and the silicone compound (S2) to the fluororesin, followed by kneading.

When the amount of the silicone compound (S2) used is too large, foam streaks caused by gas occur at the time of forming the fluororesin film to impair the appearance of the film in some cases. On the other hand, in the case where the amount is too small, the mica particles are aggregated with one another when the synthetic mica particles and the silicone compound are kneaded with the fluororesin, resulting in that the film appearance is largely impaired, such as formation of white spots on the film. Accordingly, the content of the silicone compound (S2) in the fluororesin film is preferably from 0.01 to 0.5 part by mass, and more preferably from 0.05 to 0.2 part by mass, based on 100 parts by mass of the fluororesin.

<Additive>

A known additive may be added to the agricultural fluororesin film of the present invention as needed.

For example, an UV absorber such as cerium oxide, zinc oxide or iron oxide is appropriately added, thereby obtaining an UV protection film.

<Method for Producing Agricultural Fluororesin Film>

As a method for producing the agricultural fluororesin film of the present invention, there can be used a method of preparing a mixture containing the fluororesin, the synthetic mica particles, and the treating agent and the additive which are incorporated as needed, and forming this into a film form.

The film forming method is not particularly limited, and a known method such as a calender method, an inflation method or a T-die extrusion method can be used. In terms of uniformity of the film thickness and planarity, the T-die extrusion method is suitably employed as the film forming method.

Although the film thickness is not particularly limited, it is preferably from about 40 to 150 μm, and more preferably from 50 to 100 μm. In the case where it is thicker than the above-mentioned range, flexibility at the time when used for the roll-up use is lost in some cases. In the case where it is thinner than the above-mentioned range, there is a possibility of lacking in physical strength such as snow load resistance or wind pressure resistance required for the agricultural film.

After formation into a film form, aftertreatment known in the agricultural film may be conducted. For example, the film is subjected to corona discharge treatment, and inorganic particles such as fine silica particles or fine alumina particles may be imparted to the treated surface. Further, in order to allow the inorganic particles to be firmly adhered to the film surface as needed, an agent for flowing water droplets, composed mainly of a silane coupling agent may be applied to a thickness of about 0.3 μm.

According to the present invention, breaks due to repeated contact such as friction or pounding of frames of an agricultural house or mica wires with the plastic material become difficult to occur by allowing the synthetic mica particles to be contained in the fluororesin film. Further, breaks (cracks) due to repeated bending become difficult to occur, and good durability is obtained even when used for the roll-up use. This is assumed because when the film comes into contact with a hard member such as a metal member, force applied to the film is well absorbed and dispersed by the synthetic mica particles.

On the other hand, when natural mica particles are used in place of the synthetic mica particles as shown in Comparative Examples described later, deterioration of tensile breaking strength by the sliding test is severe. It is a surprising finding that the difference in the effect between the synthetic mica and the natural mica occurs even though these belong to the same mica class, as described above.

The reason for this is assumed as follows. That is to say, the synthetic mica particles have no hydroxyl group. Compared with this, the natural mica particles have hydroxyl groups. The fluororesin film is melted in its manufacturing process, so that the fluororesin is inevitably oxidized in its forming process although in slight amounts. The oxidized moieties and the hydroxyl groups of the natural mica combine with each other to harden the film, thereby being liable to lose flexibility. It is conceivable that this leads to deterioration of tensile breaking strength by the sliding test.

Further, the synthetic mica particles have no hydroxyl group, so that it is difficult to introduce water therein. The conventional natural mica has adsorbed water, whereas the synthetic mica has no adsorbed water. It is therefore conceivable that when the synthetic mica particles are used, deterioration of weather resistance of the film itself is difficult to occur, compared to the case where the natural mica particles are used.

Furthermore, the synthetic mica particles hardly bring about a reduction of optical transparency, so that the latent good transparency of the fluororesin film is not impaired, and the agricultural fluororesin film having high optical transparency is obtained. High optical transparency is preferred in terms of the good growth of crops. In the agricultural film, it is suitable that the visible light transmittance is 90% or more.

The haze (cloudiness) of the agricultural fluororesin film of the invention is preferably from 20% to 85%, and more preferably from 50% to 80%. The haze is a measure showing the ratio of light transmitting the film while diffusing to light transmitting the film. When the haze is within this range, a clear shadow of the frame of the house is difficult to be formed, so that there is an advantage that the growth of plants in the house is liable to become uniform. Further, when the haze is more than 20%, rapid leaf temperature changes of the plants caused by rapid climate changes and the like in such a situation of fine weather after long rain are difficult to occur. Accordingly, there are many advantages that the plants are less subjected to stress to stabilize the growth thereof, and the like.

Specifically, according to the present invention, there can be realized the agricultural fluororesin film having an initial tensile breaking strength obtained by the following measuring method of 50 MPa or more and a retention of a tensile breaking strength after 2,000-time sliding test of 80% or more, more preferably 85% or more.

For example, the number of roll-up operations per year of the film used for the "roll-up use" in order to ventilate the inside of the agricultural house is assumed to be about 2,000 in terms of one way (that is, about 1,000-time reciprocation), although it varies depending on the season. Accordingly, when the film is used for the roll-up use which is the most severe use, it is conceivable that friction occurs at least 2,000 times per year. It is therefore conceivable that the film having a retention after 2,000-time sliding test of less than 80%, that is to say, the film whose deterioration due to friction of 2,000 times is larger than 20%, can not withstand the use for about 5 years.

Further, considering the use for 5 years or more, it is more preferred that deterioration after 2,000-time sliding test is less than 15%, that is to say, that the retention after 2,000-time sliding test is 85% or more.

[Method for Measuring Initial Tensile Breaking Strength]

The value of the initial tensile breaking strength in this specification is a value obtained by the following measuring method. That is to say, for the fluororesin film produced, each of initial tensile breaking strengths in MD directions (Machine Direction) and TD directions (Transverse Direction) is measured by a measuring method based on ASTM D638. The results of measurement for a test piece having a predetermined shape in which the MD direction is a longitudinal direction (tensile direction) are taken as the initial tensile strength [MD−1] in MD direction. The results of measurement for a test piece having a predetermined shape in which the TD direction is a longitudinal direction (tensile direction) are taken as the initial tensile strength [TD−1] in TD direction.

[Method for Measuring Retention after Sliding Test]

The value of the retention in this specification is a value obtained by a sliding test by a method described below. That is to say, first, the fluororesin film is cut to a strip shape of 60 cm long and 6.5 cm wide in which the MD direction is the longitudinal direction, thereby preparing a test piece 1 as shown in FIG. 1. A weight 2 is attached to one end of the test piece 1. The weight 2 plays a role of a pressing member for keeping a state that the film 1 is always in contact with a surface of an agricultural steel tube 3 (manufactured by Maruichi Steel Tube Ltd., material: GH38, diameter: 19 mm, thickness: 1.6 mm, hot dip galvanized).

The weight of the weight 2 is set so as to achieve a state where the film 1 on the steel tube 3 is not uplifted and constantly in contact with the steel tube 3. For example, it is preferred to separately measure the primary yield strength of the film to be measured and to use the weight 2 corresponding to a load of from 20% to 70% of the measured value.

In particular, a load of from 30% to 60% of the primary yield strength is more preferred, because it is close to a usage condition in the actual agricultural house.

The primary yield strength herein indicates the maximum strength that the film is able to elastically stretch or shrink. In the case of the fluororesin film, the primary yield strength is generally from 20% to 30% of the breaking strength. An agricultural film is deployed without loosening in order to withstand wind, rain and snow. It is controlled its tensity to avoid going over the primary yield strength.

Specifically, for example, in the case of performing measurement for the film of 60 μm thick, the weight 2 preferably has a weight corresponding to a load of about 55% of the primary yield strength. In the case of the film of 80 µm thick, a weight corresponding to a load of about 40% of the primary yield strength is preferred.

In FIG. 1, the other end of the test piece 1 is connected to an air cylinder (not shown), and the reciprocating motion is repeated once per 4 seconds at a stroke of 10 cm along the longitudinal direction of the test piece 1.

Figure 2:
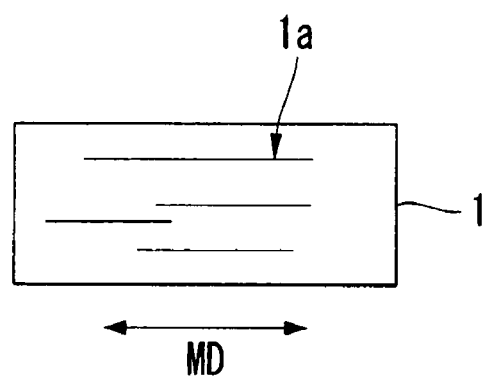
FIG. 2 is a schematic view of a test piece for illustrating a sliding test method.

When this motion is repeated 1,000 times one way (or 2,000 times one way), faint friction streaks 1a are observed on the test piece 1 along MD direction as shown in FIG. 2. A test piece having a predetermined shape in which the TD direction is the longitudinal direction is punched out so as to contain these friction streaks 1a, and the tensile breaking strength after sliding test of 1,000 times one way (or 2,000 times one way) is measured for this test piece in the same manner as for the above-mentioned initial tensile breaking strength. The resulting measured value is the tensile breaking strength [TD−2] in TD direction after sliding test.

The ratio of the tensile breaking strength [TD−2] in TD direction after sliding test to the above-mentioned initial tensile breaking strength [TD−1] in TD direction is taken as the retention (%) in TD direction.

Retention (%) in *TD* direction=[*TD*−2]/[*TD*−1]×100

Then, the sliding test is performed in the same manner as described above with the exception that the TD direction is replaced by the MD direction to determine the tensile breaking strength [MD−2] in MD direction after sliding test. That is to say, in FIG. 1, the longitudinal direction of the test piece 1 is the TD direction. Faint friction streaks 1a are observed on the test piece 1 after sliding test along TD direction, so that a test piece having a predetermined shape in which the MD direction is the longitudinal direction is punched out so as to contain these streaks 1a. By using this test piece, the tensile breaking strength after sliding test of 1,000 times one way (or 2,000 times one way) is measured for this test piece in the same manner as for the above-mentioned initial tensile breaking strength. The resulting measured value is the tensile breaking strength [MD−2] in MD direction after sliding test.

The ratio of [MD−2] to [MD−1] described above is taken as the retention (%) in MD direction.

Retention (%) in *MD* direction=[*MD*−2]/[*MD*−1]×100

Further, according to the invention, there can be realized the agricultural fluororesin film in which durability in a repeated bending test obtained by the following measuring method is 3,000,000 cycles or more.

[MIT Repeated Bending Test]

This test is a flex fatigue resistance test in which the test piece is held so that the longitudinal direction thereof becomes a vertical direction, a specified load is applied to the test piece, which is bent at an angle of 135° to the right and left at a specified rate, and the folding strength is calculated from the number of reciprocal bending times until breakage thereof. This gives an indication of durability to bending at the time of rolling up and pounding to the hard member such as the metal. In general, the thinner film is advantageous.

Specifically, the test is performed in accordance with ASTM D2176. That is to say, the test piece obtained by cutting the film to a size of 12.5 mm wide and 130 mm long is mounted on a MIT measuring instrument manufactured by Toyo Seiki Seisaku-Sho Ltd., and bent under conditions in which the load is 1.25 Kg, the bending angle to the right and left, respectively, is 135° and the number of bending times is 175 times/min. The number of times until the test piece is broken (the number of MIT repeated times) is measured. The measurement results in the case where the width direction of the test piece is the TD direction are taken as the number of MIT repeated times in TD direction, and the measurement results in the case where the width direction of the test piece is the MD direction are taken as the number of MIT repeated times in MD direction.

<Use>

The fluororesin film of the present invention is for the agricultural use, and suitably used, for example, in garden houses, agricultural houses and the like. In particular, this film can be suitably used as a film which is frequently in friction with frames by wind or the like, such as a film for the "roll-up use" which is constituted in such a manner that roll-up/roll-down are possible; a film for an arch-shaped so-called pipe house; and a lower layer film for a two-layer air house.

EXAMPLES

The invention will be described below in more detail with reference to examples, but should not be construed as being limited to these examples.

The visible light transmittance and the haze (cloudiness) were measured by the following methods. The initial tensile breaking strength and the retention were measured by the above-mentioned methods. Further, the above-mentioned MIT repeated bending test was performed.

[Method for Measuring Visible Light Transmittance]

The visible light transmittance (unit: %) in a film thickness direction was measured by using a spectrophotometer (manufactured by Shimadzu Corporation, UV-3100PC) according to JIS R3106 "Testing Method on Transmittance, Reflectance and Emittance of Flat Glasses and Evaluation of Solar Heat Gain Coefficient".

[Method for Measuring Haze (Cloudiness)]

The haze (cloudiness, unit: %) of the film was measured by using a color computer (manufactured by Suga Test Instruments Co., Ltd., MS-5) according to JIS K7105 "Testing Method of Optical Properties of Plastic".

Example 1

A fluororesin film was prepared according to a formulation shown in Table 1.

As a fluororesin, there was used ETFE (manufactured by Asahi Glass Co., Ltd., product name: Fluon ETFE C-88AX, number average molecular weight: 300,000, solid content: 100% by mass).

Three parts by mass of synthetic mica 1 (manufactured by CO-OP Chemical Co., Ltd., product name: MK200, average particle size: 6.2 µm) and 0.1 part by mass of phenyl methyl silicone oil (manufactured by Dow Corning Toray Co., Ltd., product name: SH510) were incorporated in 100 parts by mass of the fluororesin, followed by compounding using a twin screw extruder to produce pellets. Then, the fluororesin film having a thickness of 60 µm was produced by a T-die extrusion molding method.

For the resulting film, the visible light transmittance, the haze (cloudiness), the initial tensile breaking strength (in TD and MD directions) and the retention (in TD and MD directions) were each measured. The results thereof are shown in Table 1.

Further, for the resulting film, the MIT repeated bending test was performed. The number of times until the test piece is broken (the number of MIT repeated times) is shown in Table 1.

In this example, the weight of the weight 2 in the sliding test method shown in FIG. 1 was 2 kg. The 2 kg is a value corresponding to about 50% of the primary yield strength, 13 MPa, of the film obtained in this example.

Examples 2 to 12 and Comparative Examples 1 to 6

Fluororesin films were produced in the same manner as Example 1 with the exception that the formulation and the film thickness were changed as shown in Table 1.

For the resulting films, the visible light transmittance, the haze (cloudiness), the initial tensile breaking strength and the retention were each measured in the same manner as in Example 1. However, in Examples 3 to 5 and 12 and Comparative Example 1, the weight of the weight 2 in the sliding test method shown in FIG. 1 was changed to 2.5 kg. Further, the MIT repeated bending test was performed. The results thereof are shown in Table 1.

Fillers shown in Table 1 such as synthetic mica particles are as follows:
Synthetic mica 2: manufactured by CO-OP Chemical Co., Ltd., product name: MK100, average particle size: 3.5 μm.
Synthetic mica 3: manufactured by CO-OP Chemical Co., Ltd., product name: MK300, average particle size: 12.2 μm.
Synthetic mica 4: manufactured by CO-OP Chemical Co., Ltd., product name: MK100F, average particle size: 1.9 μm.
Natural mica 1: manufactured by Yamaguchi Mica Co., Ltd., product name: A-21S, average particle size: 22 μm.
Natural mica 2: manufactured by Yamaguchi Mica Co., Ltd., product name: Y-1800, average particle size: 8.2 μm.
Flat-shaped pigment: amorphous silica-cerium oxide-silica composite, manufactured by Daito Kasei Kogyo Co., Ltd., product name: Ceriguard T-3018-02, average particle size: 1.8 μm.

TABLE 1

| | Mica etc. | | Treating Agent | | | Film |
|---|---|---|---|---|---|---|
| | Kind | Parts | Kind | Parts | Fluororesin | Thickness (μm) |
| Ex. 1 | Synthetic mica 1 | 3 | Phenyl methyl silicone | 0.1 | ETFE | 60 |
| Ex. 2 | Synthetic mica 1 | 1 | Phenyl methyl silicone | 0.1 | ETFE | 60 |
| Ex. 3 | Synthetic mica 1 | 5 | Phenyl methyl silicone | 0.2 | ETFE | 80 |
| Ex. 4 | Synthetic mica 1 | 3 | Phenyl methyl silicone | 0.1 | ETFE | 80 |
| Ex. 5 | Synthetic mica 1 | 0.5 | Phenyl methyl silicone | 0.05 | ETFE | 80 |
| Ex. 6 | Synthetic mica 2 | 3 | Phenyl methyl silicone | 0.1 | ETFE | 60 |
| Ex. 7 | Synthetic mica 2 | 1 | Phenyl methyl silicone | 0.1 | ETFE | 60 |
| Ex. 8 | Synthetic mica 3 | 3 | Dimethyl silicone oil | 0.2 | ETFE | 60 |
| Ex. 9 | Synthetic mica 3 | 1 | Isobutyltrimethoxysilane | 0.05 | ETFE | 60 |
| Ex. 10 | Synthetic mica 3 | 1 | Phenyl methyl silicone | 0.05 | ETFE | 60 |
| Ex. 11 | Synthetic mica 2 | 3 | Not added | — | ETFE | 60 |
| Ex. 12 | Synthetic mica 3 | 3 | Not added | — | ETFE | 80 |
| Comp. Ex. 1. | Not added | — | Not added | — | ETFE | 80 |
| Comp. Ex. 2 | Not added | — | Not added | — | ETFE | 60 |
| Comp. Ex. 3 | Natural mica 1 | 3 | Phenyl methyl silicone | 0.2 | ETFE | 60 |
| Comp. Ex. 4 | Natural mica 2 | 3 | Phenyl methyl silicone | 0.2 | ETFE | 60 |
| Comp. Ex. 5 | Synthetic mica 4 | 3 | Phenyl methyl silicone | 0.2 | ETFE | 60 |
| Comp. Ex. 6 | Flat-shaped pigment | 1 | Isobutyltrimethoxysilane | 0.07 | ETFE | 60 |

| | Visible Light Transmittance (%) Haze (%) | Tensile Direction | Initial Tensile Breaking Strength (MPa) | Retention of Breaking Strength after Sliding Test (%) | | Number of MIT Repeated Times (10,000 times) |
|---|---|---|---|---|---|---|
| | | | | 1,000 times | 2,000 times | |
| Ex. 1 | 91.9 | TD | 59 | 100 | 100 | 300 or more |
| | 54.1 | MD | 63 | 100 | 100 | 300 or more |
| Ex. 2 | 93.0 | TD | 58 | 100 | 100 | 300 or more |
| | 24.0 | MD | 68 | 100 | 99 | 300 or more |
| Ex. 3 | 90.6 | TD | 60 | 98 | 98 | 300 or more |
| | 75.1 | MD | 60 | 100 | 100 | 300 or more |
| Ex. 4 | 91.6 | TD | 58 | 100 | 100 | 300 or more |
| | 60.4 | MD | 62 | 98 | 98 | 300 or more |
| Ex. 5 | 92.7 | TD | 57 | 98 | 96 | 300 or more |
| | 21.2 | MD | 63 | 98 | 98 | 300 or more |
| Ex. 6 | 91.4 | TD | 59 | 98 | 98 | 300 or more |
| | 53.1 | MD | 65 | 100 | 88 | 300 or more |
| Ex. 7 | 92.6 | TD | 53 | 100 | 96 | 300 or more |
| | 25.1 | MD | 65 | 100 | 88 | 300 or more |
| Ex. 8 | 92.5 | TD | 53 | 100 | 100 | 300 or more |
| | 49.8 | MD | 50 | 94 | 94 | 300 or more |
| Ex. 9 | 93.0 | TD | 55 | 93 | 93 | 300 or more |
| | 22.4 | MD | 65 | 86 | 86 | 300 or more |
| Ex. 10 | 93.2 | TD | 57 | 94 | 94 | 300 or more |
| | 23.4 | MD | 66 | 92 | 92 | 300 or more |
| Ex. 11 | 90.0 | TD | 56 | 95 | 91 | 300 or more |
| | 52.1 | MD | 68 | 99 | 93 | 300 or more |
| Ex. 12 | 90.1 | TD | 59 | 97 | 88 | 300 or more |
| | 61.2 | MD | 60 | 90 | 88 | 300 or more |
| Comp. | 94.5 | TD | 56 | 82 | 77 | 140 |

TABLE 1-continued

| Ex. 1 | 3.4 | MD | 55 | 76 | 67 | 140 |
| Comp. | 94.0 | TD | 60 | 85 | 78 | 210 |
| Ex. 2 | 4.1 | MD | 67 | 90 | 79 | 220 |
| Comp. | 85.4 | TD | 59 | 83 | 76 | 300 or more |
| Ex. 3 | 56.3 | MD | 70 | 81 | 74 | 300 or more |
| Comp. | 88.6 | TD | 62 | 80 | 73 | 300 or more |
| Ex. 4 | 52.5 | MD | 65 | 80 | 70 | 300 or more |
| Comp. | 93.5 | TD | 59 | 83 | 76 | 160 |
| Ex. 5 | 26.5 | MD | 62 | 85 | 76 | 170 |
| Comp. | 87.7 | TD | 60 | 89 | 76 | 160 |
| Ex. 6 | 32.6 | MD | 69 | 88 | 72 | 170 |

As shown in the results of Table 1, in Comparative Examples 1 and 2 in which no synthetic mica particles are added, the visible light transmittance is high, but the retention after 2,000-time sliding test is lower than 80%, which shows that deterioration of the tensile breaking strength due to friction is severe. Further, in the MIT bending test, the film of Comparative Example 1 is broken by bending of 1,400,000 times, and the film of Comparative Example 2 was broken by bending of 2,100,000 times in TD direction and by bending of 2,200,000 times in MD direction.

Compared with this, in all of Examples 1 to 12 in which the synthetic mica particles are added, the retention after the sliding test is as high as 85% or more, which shows that deterioration of the tensile breaking strength due to friction is slight. Further, in the MIT bending test, the films were not broken even by bending of 3,000,000 times or more. A visible light transmittance of 90% or more is also obtained.

In particular, in Example 1, the retention after 2,000-time sliding test is 100% in both TD and MD directions, which shows that the tensile breaking strength is not deteriorated at all.

Further, when the film of Example 9 in which the silane coupling agent (S1) was used as the treating agent is compared to the film of Example 10 in which the nonreactive silicone oil was used as the silicone compound (S2), the film of Example 10 has a higher retention in MD direction.

In Comparative Examples 3 and 4 in which the natural mica particles are used in place of the synthetic mica particles, good performance was shown for the MIT bending test, but the visible light transmittance was lower than 90%. This is unfavorable as an agricultural film. Further, the retention after 2,000-time sliding test is lower than 80%, which shows that deterioration of the tensile breaking strength is severe.

In Comparative Example 5 in which synthetic mica 4 having an average particle size as small as 1.9 μm is used, the visible light transmittance is high, but the retention after 2,000-time sliding test is lower than 80%, which shows that deterioration of the tensile breaking strength is severe. Further, in the MIT bending test, the film was broken by bending of 1,600,000 times in TD direction and by bending of 1,700,000 times in MD direction.

In Comparative Example 6 in which the flat-shaped pigment is used in place of the synthetic mica particles, the visible light transmittance is 88% or less. This is unfavorable as an agricultural film. Further, the retention after 2,000-time sliding test is lower than 80%, which shows that deterioration of the tensile breaking strength is severe. In the MIT bending test, the film is broken by bending of 1,600,000 times in TD direction and by bending of 1,700,000 times in MD direction.

While the invention has been described in detail and with reference to specific embodiments thereof, it will be apparent to one skilled in the art that various changes and modifications can be made therein without departing from the sprit and scope thereof.

This application is based on Japanese patent application No. 2008-181387 filed on Jul. 11, 2008, the entire contents of which are incorporated hereinto by reference. All references cited herein are incorporated in their entirety.

INDUSTRIAL APPLICABILITY

The fluororesin film of the invention is for the agricultural use, and suitably used, for example, in garden houses, agricultural houses and the like. In particular, this film can be suitably used as a film which is frequently in friction with frames by wind or the like, such as a film for the "roll-up use" which is constituted in such a manner that roll-up/roll-down are possible; a film for an arch-shaped so-called pipe house; and a lower layer film for a two-layer air house.

REFERENCE SIGNS LIST

1 Test Piece
1a Friction Streak
2 Weight
3 Steel Tube

The invention claimed is:

1. An agricultural fluororesin film comprising: a fluororesin; and synthetic mica particles having an average particle size of from 3 μm to 15 μm and dispersed in the fluororesin, wherein the content of the synthetic mica particles is from 0.5 to 5 parts by mass based on 100 parts by mass of the fluororesin, and wherein a treating agent selected from the group consisting of an alkyl group-containing silane coupling agent and a silicone compound is present on surfaces of the synthetic mica particles.

2. The agricultural fluororesin film according to claim 1, wherein the treating agent is nonreactive silicone oil, and the content of the nonreactive silicone oil in the film containing the fluororesin is from 0.02 to 0.3 parts by mass based on 100 parts by mass of the fluororesin.

3. The agricultural fluororesin film according to claim 1, which has an initial tensile breaking strength of 50 MPa or more and a retention of a tensile breaking strength after 2,000-time sliding test of 80% or more.

4. The agricultural fluororesin film according to claim 1, wherein the synthetic mica particles have an average particle size of from 3 μm to 10 μm.

5. The agricultural fluororesin film according to claim 1, wherein the synthetic mica particles have an average particle size of from 3 μm to less than 6 μm, and the content thereof is from 3 to 5 parts by mass based on 100 parts by mass of the fluororesin.

6. The agricultural fluororesin film according to claim 1, wherein the synthetic mica particles have an average particle size of from 6 μm to less than 10 μm, and the content thereof is from 0.5 to 5 parts by mass based on 100 parts by mass of the fluororesin.

7. The agricultural fluororesin film according to claim 1, which has a visible light transmittance of 90% or more.

8. The agricultural fluororesin film according to claim 3, wherein the retention is 85% or more.

9. The agricultural fluororesin film according to claim 1, wherein the synthetic mica is potassium tetrasilicon mica or fluorphlogopite.

10. The agricultural fluororesin film according to claim 1, which has a haze of from 20 to 85%.

* * * * *